(12) United States Patent
Park et al.

(10) Patent No.: US 8,983,151 B2
(45) Date of Patent: Mar. 17, 2015

(54) APPARATUS FOR RECOGNIZING FACE BASED ON ENVIRONMENT ADAPTATION

(71) Applicant: Suprema Inc., Gyeonggi-do (KR)

(72) Inventors: Bo Gun Park, Gyeonggi-do (KR); Ki Deok Lee, Gyeonggi-do (KR); Ho Chul Shin, Gyeonggi-do (KR); Bong Seop Song, Gyeonggi-do (KR); Jae Won Lee, Gyeonggi-do (KR)

(73) Assignee: Suprema Inc., Gyeonggi-Do (KR)

( * ) Notice: Subject to any disclaimer, the term of this patent is extended or adjusted under 35 U.S.C. 154(b) by 78 days.

(21) Appl. No.: 13/778,451

(22) Filed: Feb. 27, 2013

(65) Prior Publication Data

US 2013/0222564 A1   Aug. 29, 2013

(30) Foreign Application Priority Data

Feb. 29, 2012   (KR) ........................ 10-2012-0021306

(51) Int. Cl.
| | |
|---|---|
| *G06K 9/00* | (2006.01) |
| *H04N 5/232* | (2006.01) |
| *G06K 9/20* | (2006.01) |
| *H04N 5/235* | (2006.01) |
| *G06K 9/34* | (2006.01) |

(52) U.S. Cl.
CPC .......... *H04N 5/23219* (2013.01); *G06K 9/2027* (2013.01); *H04N 5/2354* (2013.01); *G06K 9/00248* (2013.01)
USPC ........................................................ 382/118

(58) Field of Classification Search
USPC .................... 382/115, 117, 118, 124; 348/77; 359/359, 639, 708; 356/71; 340/5.53, 340/5.83
See application file for complete search history.

(56) References Cited

U.S. PATENT DOCUMENTS

| | | | | |
|---|---|---|---|---|
| 6,920,236 | B2* | 7/2005 | Prokoski | 382/115 |
| 7,512,255 | B2* | 3/2009 | Kakadiaris et al. | 382/118 |
| 7,715,595 | B2* | 5/2010 | Kim et al. | 382/117 |
| 8,224,040 | B2* | 7/2012 | Li | 382/118 |
| 8,582,833 | B2* | 11/2013 | Chung et al. | 382/118 |
| 8,754,934 | B2* | 6/2014 | Shi et al. | 348/77 |
| 2013/0222564 | A1* | 8/2013 | Park et al. | 348/77 |

\* cited by examiner

*Primary Examiner* — Amir Alavi
(74) *Attorney, Agent, or Firm* — Bacon & Thomas, PLLC

(57) ABSTRACT

An apparatus for recognizing a face of a person adaptively controls brightness of illumination around the person through image analysis. The apparatus obtains an optimal image through the adaptive brightness control of the illumination regardless of various environments for face recognition.

11 Claims, 6 Drawing Sheets

APPARATUS FOR RECOGNIZING FACE BASED ON ENVIRONMENT ADAPTATION

CROSS-REFERENCE(S) TO RELATED APPLICATION(S)

The present invention claims priority to Korean Patent Application No. 10-2012-0021306, filed on Feb. 29, 2012, which is incorporated herein by reference.

FIELD OF THE INVENTION

The present invention relates to a security certification technique; and more particularly, to a face recognition technique.

BACKGROUND OF THE INVENTION

A biometric recognition technology is suggested instead of a fingerprint recognition technology in fields such as access control, assiduity management, an integrated building management system, an automatic teller machine, a computer security, an electronic commerce authentication, an airport information system or the like. Particularly, a face recognition technology is used for recognizing a face of a person by using face information indicating unique characteristics of the person.

A typical face recognition apparatus is configured such that a user authenticates a person while monitoring a face of the person which has been captured on a screen. An apparatus capable of capturing an image by using only a visible light can work well under a comparatively bright environment with visible light, but outputs a black image in a dark environment without visible light. A typical illuminometer does not have such problem, but causes malfunction when bright light turns dark or when the light is shielded by a user.

SUMMARY OF THE INVENTION

In view of the above, the present invention provides an apparatus for recognizing a face of a person which is capable of acquiring an optimal image under transitionally changing environment from which the face is recognizable.

In accordance with an aspect of the present invention, there is provided an apparatus for recognizing a face of a person, which includes: a visible light image acquisition unit configured to acquire a visible light image of the person; an infrared image acquisition unit configured to acquire an infrared image of the person; an image analysis module configured to detect respective face areas from the visible light image and the infrared image, estimate a face area of the visible light image by using the infrared image in the case of not detecting the face area of the visible light image, and analyze facial features in the detected or the estimated face area of the visible light image to determine suitability of face recognition; and an illumination control unit configured to control, when the image analysis module determines that the face area of the visible light image is not suitable for face recognition, brightness of illumination so that the visible light image acquisition unit re-acquires a visible light image from which a face is recognizable.

In accordance with another aspect of the present invention, there is provided an apparatus for recognizing a face of a person, which includes: a visible light image acquisition unit configured to acquire a visible light image of the person; an infrared image acquisition unit configured to acquire an infrared image of the person; an image analysis module configured to detect respective face areas of the visible light image and the infrared image, estimate a face area of the visible light image using the infrared image in the case of not detecting the face area of the visible light image, and analyze facial features in the detected or the estimated face area of the visible light image to determine whether or not the detected or the estimated face area of the visible light image has suitability for face recognition; and an image output unit configured to selectively display one of the visible light image and the infrared image based on the determination result of the image analysis module.

In accordance with the embodiments of the present invention, a face recognition ratio can be increased by obtaining an image for face recognition which is optimized for an environment. In other words, an optimal image for face recognition can be obtained regardless of a surrounding environment for image acquisition, e.g., regardless of when a bright illumination turns dark or when light is shielded by a user, by adaptively controlling brightness of the illumination through image analysis or by selecting and outputting an image that has been adaptively optimized for an environment through image analysis.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
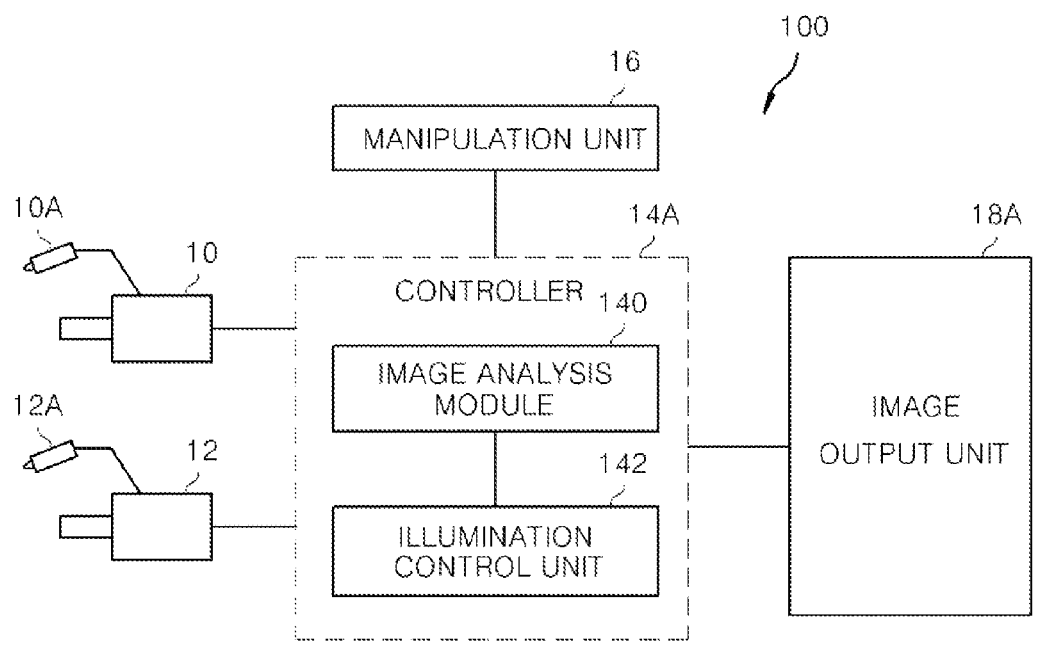
FIG. 1 is a block diagram of an apparatus for recognizing a face of a person in accordance with a first embodiment of the present invention.

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims. Throughout the specification and the accompanying figures, like reference numerals refer to identical or functionally similar elements.

FIG. 1 is a block diagram of an apparatus for recognizing a face of a person in accordance with a first embodiment of the present invention.

A face recognition apparatus 100 of the embodiment includes an infrared image acquisition unit 10, a visible light image acquisition unit 12, a controller 14A, a manipulation unit 16, and an image output unit 18A.

The face recognition apparatus 100 is used for identifying faces of people and thus applied to various fields such as access control, assiduity management, an integrated building management system, an automatic teller machine, a computer security, an electronic commerce authentication, an airport information system and the like. It should be noted that FIG. 1 schematically illustrates only components of the face recognition apparatus 100 which are needed to explain the embodiment of the present invention. Therefore, the face recognition apparatus 100 may include additional components for performing other functions required for the operation thereof.

The face recognition apparatus 100 of the embodiment adaptively controls brightness of illumination around the person through image analysis. Consequently, a recognition ratio of the face recognition apparatus 100 can be increased by obtaining an optimal image for an environment through adaptive brightness control of the illumination regardless of various environments for face recognition, e.g., regardless of an environment in which darkness and brightness are consecutively changed or light is shielded by a user.

The infrared image acquisition unit 10 and the visible light image acquisition unit 12, which may be an infrared camera and a visible-light camera, respectively, for example, acquire face images of a person. The infrared image acquisition unit 10 irradiates infrared ray and acquires an infrared image of the person. The infrared image acquisition unit 10 includes an infrared irradiation unit 10A to irradiate the infrared ray to the person. The infrared irradiation unit 10A may be arranged outside the infrared image acquisition unit 10 as shown in FIG. 1, or may be arranged therein. The infrared irradiation unit 10A may control the wavelength of infrared illumination, e.g., a near-infrared illumination having a wavelength of about 700 nm to 1400 nm, a long wavelength infrared illumination having a wavelength of about 1400 nm.

In accordance with the embodiment, the infrared image acquisition unit 10 obtains an infrared image of a person using the infrared irradiation unit 10A regardless of external illumination, thereby enabling a user to stably recognize a face of the person. For example, the infrared image is obtained even in an environment in which day and night are consecutively changed or an indoor environment that is greatly affected by an external illumination such as a low illumination environment, so that the face can be recognized. In accordance with the embodiment, when it is difficult to recognize a face of a person in the visible light image obtained by the visible light image acquisition unit 12, the infrared image acquisition unit 10 provides an infrared image so that a face area of the visible light image can be derived from the infrared image.

The visible light image acquisition unit 12 irradiates visible light to a person and captures a visible light image of the person. The visible light image acquisition unit 12 includes a visible light irradiation unit 12A to irradiate a visible light. The visible light irradiation unit 12A may be arranged outside the visible light image acquisition unit 12 as shown in FIG. 1, or may be arranged therein. Various types of visible light illumination may be used. A representative source of visible light illumination may be a green light emitting device (LED), a white light emitting device as well as a light emitting device having wavelengths of visible light. In addition, a halogen lamp, an incandescent lamp, a Xenon flash lamp or the like may also be used.

In accordance with the embodiment, brightness of light irradiated by the visible light irradiation unit 12A can be controlled. Alternatively, visible light may be irradiated by a subsidiary visible light irradiation unit in addition to the visible light irradiation unit 12A. The visible light image acquisition unit 12 re-acquires a visible light image under a state where an illumination control unit 142 controls the brightness of illumination around the person.

Meanwhile, although the infrared image acquisition unit 10 and the visible light image acquisition unit 12 are shown separately in FIG. 1, they may be implemented as an integrated image acquisition unit capable of acquiring both the infrared image and the visible light image at the same time.

The controller 14A includes an image analysis module 140 and an illumination control unit 142, and performs an overall management and control function required for the operation of the face recognition apparatus 100. More specifically, the controller 14A controls the infrared image acquisition unit 10 and the visible light image acquisition unit 12 so that an infrared image and a visible light image can be acquired, respectively. Also, the controller 14A controls the infrared irradiation unit 10A and the visible light irradiation unit 12A to irradiate infrared ray and visible light around a person. The image analysis module 140 analyzes the visible light image and the infrared image and detects a face area of the visible light image and a face area of the infrared image, respectively. When the face area of the visible light image is not properly detected due to a poor illumination, the face area of the visible light image can be estimated via the infrared image, and the suitability for the face recognition on the face area is determined by examining the brightness of the detected or estimated face area, which will be described with reference to FIG. 2 hereinafter.

When it is determined by the image analysis module 140 that the face area of the visible light image is not suitable for face recognition, the illumination control unit 142 controls the brightness of the illumination around the person so that the visible light image acquisition unit 12 can re-acquire a visible light image of the person from which a face is recognizable. For example, the brightness of the illumination can be increased by increasing the intensity of the visible light irradiated by the visible light irradiation unit 12A. Alternatively, the brightness of the illumination may be increased by a manner of increasing the number of visible light irradiation units 12A.

The manipulation unit 16 receives an operation signal inputted by a user and provides it to the controller 14A, thereby processing an event corresponding to the operation signal.

The image output unit 18A displays at least one of the visible light image acquired by the visible light image acquisition unit 12 and the infrared image acquired by the infrared image acquisition unit 10. At this time, the image output unit 18A may display the visible light image that is re-acquired by the visible light image acquisition unit 12 under a state where the brightness of the illumination is controlled by the illumination control unit 142. A user may then recognize a face while monitoring the image displayed by the image output unit 18A.

Figure 2:
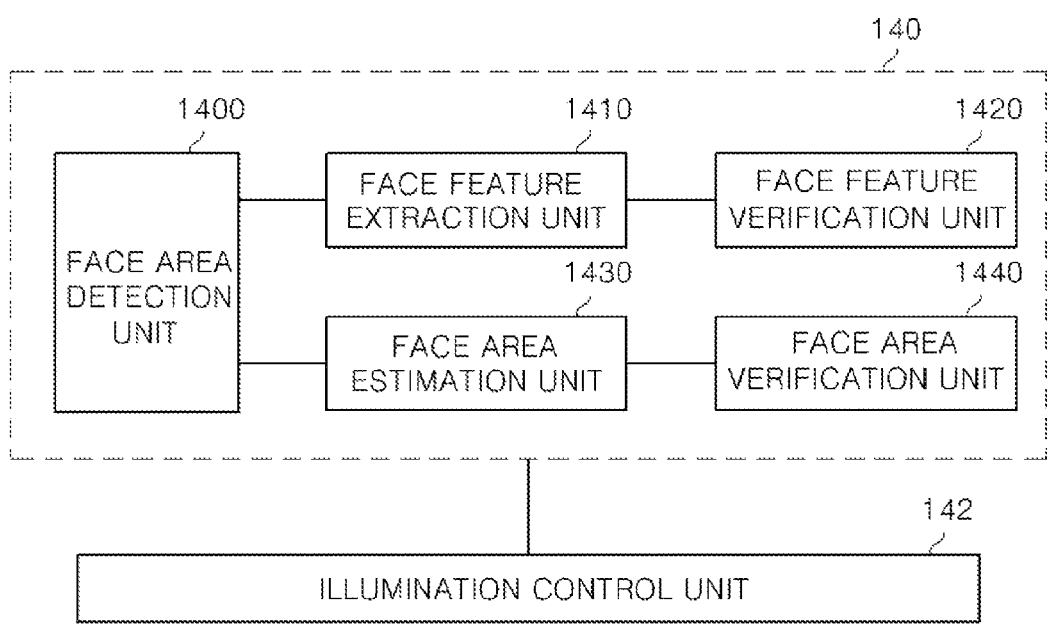
FIG. 2 is a detailed block diagram of an image analysis module shown in FIG. 1.

FIG. 2 is a detailed block diagram of the image analysis module 140 shown in FIG. 1.

The image analysis module 140 includes a face area detection unit 1400, a face feature extraction unit 1410, a face feature verification unit 1420, a face area estimation unit 1430 and a face area verification unit 1440.

The face area detection unit 1400 detects a face area of the visible light image and a face area of the infrared image. The detection of the face areas may be achieved by employing any one of techniques known in the art. For example, the face area detection unit 1400 may detect the contour of a face from an input image, catch facial components in the face such as eyes, a nose, a mouth, and the like, and then extract a face area on a basis of the extracted facial components. During the extraction, if positions of two eyes are caught, a distance between the eyes can be calculated. The face area detection unit 1400 may extract the face area from the input image based on the distance between the eyes.

When it is determined by the face area detection unit 1400 that the face area of the visible light image is properly detected, the face feature extraction unit 1410 removes a background image from the detected face area. The reason to remove the background image from the face area is that the accuracy of the face recognition can be increased by measuring brightness of the face area without the background image.

Further, the face feature extraction unit 1410 extracts face features from the face area. The facial features refer to information indicating unique characteristics contained in the face area such as eyes, a nose, a mouth, and the like. For example, PCA (Principal Component Analysis), LDA (Linear Discriminate Analysis) or the like may be employed to extract the facial features. LBP (Local Binary Pattern) capable of indicating texture information by using local image information may also be employed. The LBP can extract facial features that are strongly immune to illumination changes, and thus is widely used for expressing features of a face. In addition, a 2D-PCA (2-Dimensional Principal Component Analysis) method may be employed, which is capable of extracting facial features of a face based on a 2-dimensional image matrix. The projection matrix used in the 2D-PCA method is smaller than that used in a typical PCA method, so that a computational load and a required memory can be comparatively reduced. Hence, the 2D-PCA technique can be easily applied to a portable device, a low performance embedded system and the like. Therefore, the recognition of the face can be achieved in a short period of time, i.e., in real time.

The face feature verification unit 1420 verifies whether or not the facial features have been exactly extracted by the face feature extraction unit 1410. In other words, it is verified whether or not the extracted facial features are sufficient for face recognition. More specifically, if it is determined that the facial features have not been extracted or the extracted facial features are not sufficient for face recognition due to the poor quality of the visible light image obtained under low illumination environment, the illumination control unit 142 increases the brightness of the illumination so that the visible light image acquisition unit 12 can re-acquire a visible light image under the controlled brightness of the illumination.

If it is determined by the face area detection unit 1400 that the face area of the visible light image is not detected due to the poor quality of the visible light image, the face area estimation unit 1430 tries to extract the face area using the infrared image. To be more specific, the face area estimation unit 1430 removes a background image from the face area of the infrared image, and compares the face area of the infrared image with the visible light image to estimate a face area, which corresponds to the face area of the infrared image, in the visible light image. Further, the face area estimation unit 1430 removes a background image from the estimated face area of the visible light image. The reason that the background image is removed from the face area of the visible light image is that the accuracy of the face recognition can be increased by measuring the brightness of the face area without the background image.

The face area verification unit 1440 verifies the brightness of the face area estimated by the face area estimation unit 1430. The face area verification unit 1440 may verify the brightness of the face area by comparing the brightness of the face area estimated by the face area estimation unit 1430 with a preset threshold. For example, assuming that the brightness of the face area of the visible light image is measured in terms of 256 brightness levels ranging from 0 to 255, the face area verification unit 1440 measures the brightness level of the face area of the visible light image to verify whether or not the measured brightness level is greater or less than the preset threshold. At this time, reference data for the brightness levels may be stored in advance which can be compared to measure the brightness level of the estimated brightness of the face area.

If the brightness level of the face area of the visible light image is smaller than or equal to the preset threshold, the illumination control unit 142 controls the visible light irradiation unit 12A to increase the brightness of the illumination around the user. Accordingly, the visible light image acquisition unit 12 re-acquires a visible light image under the controlled brightness of the illumination. As a result, a user can recognize a face through the use of the re-acquired visible light image.

Figure 3:
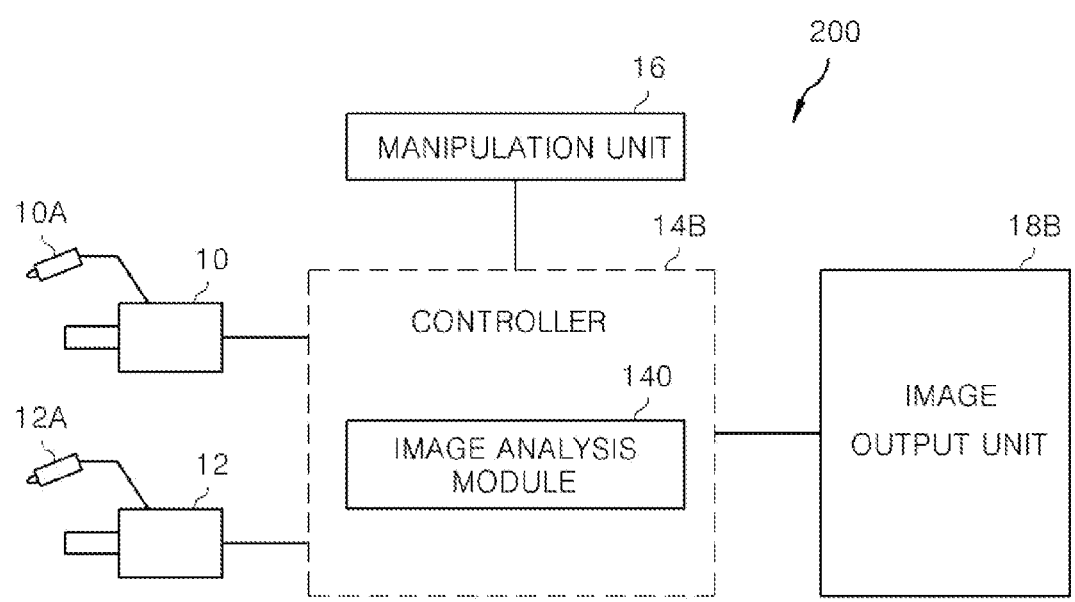
FIG. 3 is a block diagram of an apparatus for recognizing a face of a person in accordance with a second embodiment of the present invention.

FIG. 3 is a block diagram of an apparatus for recognizing a face of a person in accordance with a second embodiment of the present invention.

A face recognition apparatus 200 of the embodiment includes an infrared image acquisition unit 10, a visible light image acquisition unit 12, a controller 14B, a manipulation unit 16 and an image output unit 18B.

The face recognition apparatus 200 is substantially identical to the face recognition apparatus 100, excepting that it does not include the illumination controller 14A and that the image output unit 18B functions differently from the image output unit 18A. In brief, the face recognition apparatus 200 of this embodiment is configured to provide an optimal image adaptive to the environment through image analysis. Hereinafter, the configuration of the face recognition apparatus 200 will be described in detail mainly based on the differences from the face recognition apparatus 100 shown in FIG. 1.

The infrared image acquisition unit 10 irradiates infrared ray and acquires an infrared image of the person. The infrared image acquisition unit 10 includes an infrared irradiation unit 10A to irradiate the infrared ray to the person. In accordance with the embodiment, the infrared image acquisition unit 10 obtains an infrared image using the infrared irradiation unit 10A regardless of external illumination, thereby allowing a user to stably recognize a face. In accordance with the embodiment, when it is difficult to recognize a face of the person in a visible light image obtained by the visible light image acquisition unit 12, the infrared image acquisition unit 10 provides an infrared image so that a face area can be extracted from the visible light image using the infrared image.

The visible light image acquisition unit 12 irradiates visible light to a person and captures a visible light image of the person. The visible light image acquisition unit 12 includes a visible light irradiation unit 12A to irradiate the visible light.

The controller 14B includes an image analysis module 140 and performs an overall management and control function required for the operation of the face recognition apparatus 200. More specifically, the controller 14B controls the infrared image acquisition unit 10 and the visible light image acquisition unit 12 so that an infrared image and a visible light image can be acquired, respectively.

The image analysis module 140 analyzes the infrared image acquired by the infrared image acquisition unit 10 and the visible light image acquired by the visible light image acquisition unit 12 to detect a face area of the visible light image and a face area of the infrared image, respectively.

When the face area of the visible light image is not properly detected due to a poor illumination, the face area of the visible light image can be estimated via the infrared image, and the suitability for the face recognition of the face area is determined by examining the brightness of the detected or estimated face area of the visible light image.

The manipulation unit 16 receives an operation signal inputted by a user and provides it to the controller 14A, thereby processing an event corresponding to the operation signal. The image output unit 18B selectively displays one of the images acquired by the visible light image acquisition unit 12 and the infrared image acquisition unit 10. In other words, the image output unit 18B outputs an image optimized for an environment between the visible light image and the infrared image in order to increase a recognition ratio. The detailed description of the image selection will be described with reference to FIG. 4. A user may then recognize a face while monitoring the image displayed by the image output unit 18B.

Figure 4:
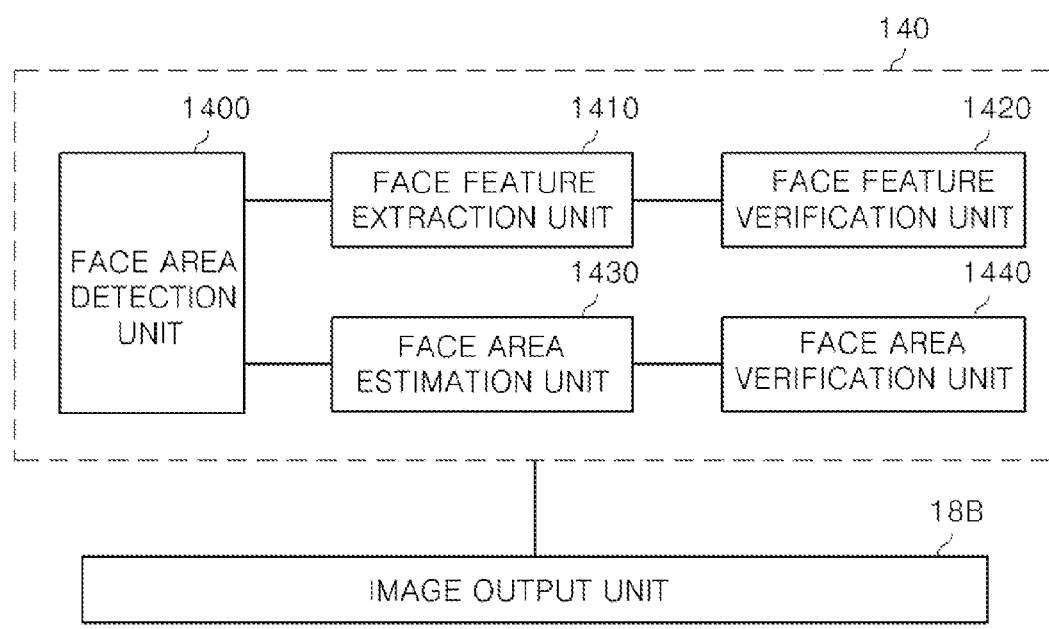
FIG. 4 is a detailed block diagram of an image analysis module shown in FIG. 3.

FIG. 4 is a detailed block diagram of an image analysis module 140 shown in FIG. 3.

The image analysis module 140 includes a face area detection unit 1400, a face feature extraction unit 1410, a face feature verification unit 1420, a face area estimation unit 1430 and a face area verification unit 1440.

The face area detection unit 1400 detects a face area of the visible light image and a face area of the infrared image. When the face area of the visible light image is detected by the face area detection unit 1400, the face feature extraction unit 1410 removes a background image from the face area of the visible light image. Further, the face feature extraction unit 1410 extracts facial features from the face area of the visible light image. The face feature verification unit 1420 then verifies whether or not the facial features have been exactly extracted by the face feature extraction unit 1410. In other words, it is verified whether or not the extracted facial features are sufficient for face recognition.

To be more specific, if it is determined that the facial features have not been extracted or the extracted facial features are not sufficient for face recognition due to the poor quality of the visible light image, the image output unit 18B displays the infrared image. If, however, it is determined that the facial features have been extracted, the image output unit 18B displays the visible light image. Meanwhile, when the facial features have not been extracted exactly, it is regarded that the visible light image has a poor quality and the infrared image is displayed instead of the visible light image.

If it is determined by the face area detection unit 1400 that the face area of the visible light image is not detected, the face area estimation unit 1430 tries to extract the face area of the visible light image by using the infrared image. More specifically, the face area estimation unit 1430 removes a background image from the face area of the infrared image, and compares the face area of the infrared image with the visible light image to estimate a face area of the visible light image, which corresponds to the face area of the infrared image, in the visible light image. Further, the face area estimation unit 1430 removes a background image from the estimated face area of the visible light image. The face area verification unit 1440 then verifies brightness of the face area estimated by the face area estimation unit 1430.

If the brightness level of the face area estimated by the face area estimation unit 1430 is smaller than or equal to a preset threshold, the image output unit 18B displays the infrared image. When the brightness level of the face area of the visible light image is smaller than or equal to the preset threshold, it is regarded that the visible light image has a poor quality and the infrared image is displayed instead of the visible light image.

Figure 5:
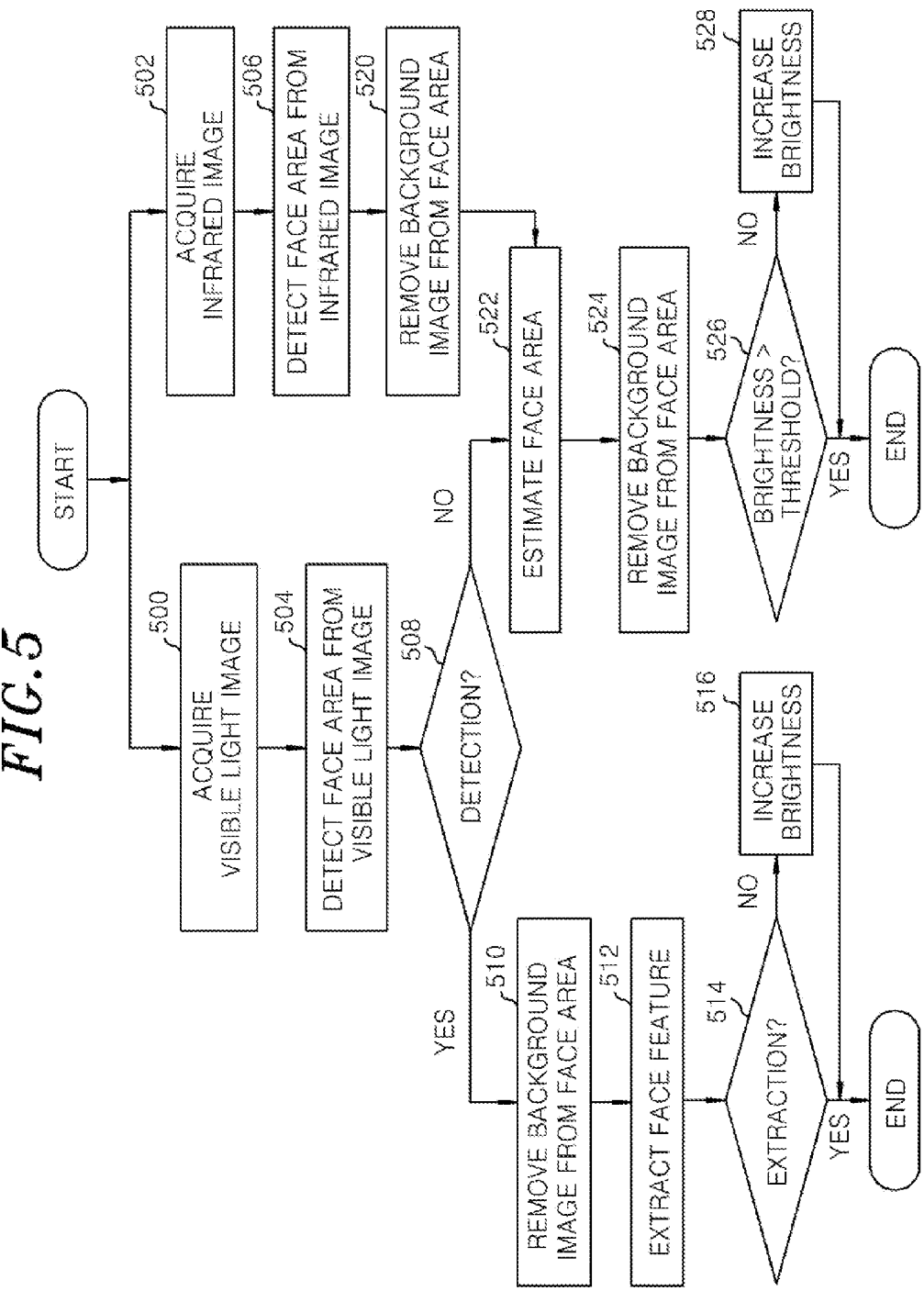
FIG. 5 is a flowchart illustrating a method for recognizing a face of a person in accordance with the first embodiment of the present invention.

FIG. 5 is a flowchart illustrating a method for recognizing a face of a person in accordance with the first embodiment of the present invention.

The face recognition apparatus 100 acquires a visible light image and an infrared image in operations 500 and 502, respectively. Then, the face recognition apparatus 100 analyzes the acquired visible light image and the infrared image to detect respective face areas from the visible light image and the infrared image in operations 504 and 506. In operation 508, it is checked whether or not the face area of the visible light image is successfully detected. When the face area of the visible light image is detected, a background image is removed from the face area of the visible light image in operation 510, and facial features are extracted from the face area of the visible light image in operation 512. Thereafter, it is verified that the facial features are exactly extracted in operation 514. If it is verified that the facial features have not been exactly extracted, the brightness of the illumination is increased in operation 516, which allows the face recognition apparatus 100 to re-acquire a visible light image under the controlled brightness of the illumination.

Meanwhile, if it is determined in operation 508 that the face area of the visible light image is not detected, the face recognition apparatus 100 estimates a face area of the visible light image, which corresponds to the face area of the infrared image obtained in operation 520 by removing a background image from the face area of the infrared ray image, in the visible light image in operation 522. Thereafter, a background image of the visible light image is removed from the estimated face area of the visible light image in operation 524. If the brightness of the face area of the visible light image is smaller than or equal to the preset threshold, the brightness of the illumination is increased in operation 528, which allows the face recognition apparatus 100 to re-acquire a visible light image under the controlled brightness of the illumination.

Figure 6:
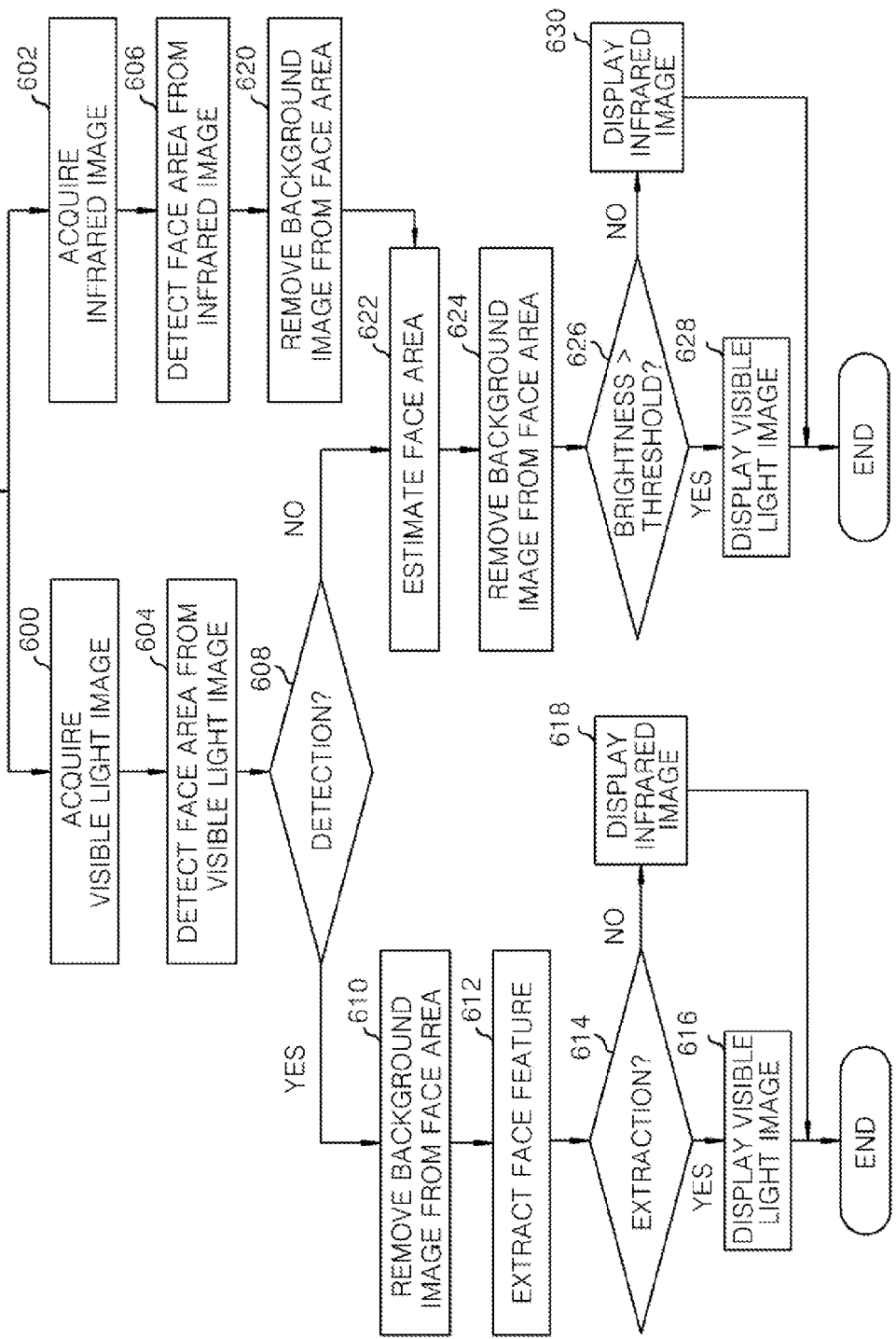
FIG. 6 is a flowchart illustrating a method for recognizing a face of a person in accordance with the second embodiment of the present invention.

FIG. 6 is a flowchart illustrating a method for recognizing a face of a person in accordance with the second embodiment of the present invention.

The face recognition apparatus 200 acquires a visible light image and an infrared image in operations 600 and 602, respectively. The face recognition apparatus 200 then analyzes the visible light image and the infrared image to detect face areas from the images in operations 604 and 606, respectively. In operation 608, it is checked whether or not a face area of the visible light image is successfully detected in operation 606. When the face area of the visible light image is successfully detected, a background image of the visible light image is then removed from the face area of the visible light image in operation 610, and facial features are extracted from the face area of the visible light image in operation 612. Thereafter, it is verified that the facial features are exactly extracted in operation 614. If it is verified that the facial features have not been exactly extracted or the extracted facial features are not sufficient for face recognition, the face recognition apparatus 200 displays the infrared image on a screen operation 618. If, however, it is verified that the facial features have been exactly extracted, the face recognition apparatus 200 displays the visible light image in operation 616.

Meanwhile, if it is determined in operation 608 that the face area of the visible light image is not detected, the method goes to operation 622. In operation 622, the face recognition apparatus 200 estimates a face area of the visible light image, which corresponds to the face area of the infrared image obtained in operation 620 by removing a background image from the face area of the infrared ray image, from the visible light image. Thereafter, a background image of the visible light image is removed from the face area of the visible light image in operation 624. The brightness of the face area of the visible light image is compared with the preset threshold in operation 626. If the brightness of the face area of the visible light image is smaller than or equal to the preset threshold, the infrared image is displayed on the screen in operation 630.

While the invention has been shown and described with respect to the embodiments, and it will be understood by those skilled in the art that various changes and modifications may be made without departing from the original scope of the present invention. Therefore, the embodiments described in the present invention are not intended to limit the technical concept of the present invention, and are merely intended to describe the present invention. The scope of the present invention is not limited by those embodiments, but is indicated by the accompanying claims. Changes and modifications within an equivalent scope to the scope of the claims should be interpreted as being included in the scope of the present invention.

What is claimed is:

1. An apparatus for recognizing a face of a person, comprising:
    a first acquirer configured to acquire a visible light image of the person;
    a second acquirer configured to acquire an infrared image of the person;
    an analyzer configured to detect respective face areas from the visible light image and the infrared image, estimate a face area of the visible light image by using the infrared image in the case of not detecting the face area of the visible light image, and analyze facial features in the detected or the estimated face area of the visible light image to determine suitability of face recognition; and
    a controller configured to control, when the analyzer determines that the face area of the visible light image is not suitable for face recognition, brightness of illumination so that the first acquirer re-acquires a visible light image from which a face is recognizable.

2. The apparatus claim 1, wherein the analyzer includes:
    a detector configured to detect the respective face areas of the visible light image and the infrared image;
    an extractor configured to remove, when the face area of the visible light image is properly detected, a background image from the visible light face area and extract the facial features in the face area of the visible light image; and
    a verifier configured to verify whether or not the facial features are exactly extracted.

3. The apparatus of claim 2, wherein the controller increases, when the facial features are not exactly extracted, brightness of illumination so that the first acquirer re-acquires a visible light image from which a face is recognizable under the controlled brightness of illumination.

4. The apparatus of claim 1, wherein the analyzer includes:
    a detector configured to detect the respective face areas from the visible light image and the infrared image;
    an estimator configured to remove, when the face area of the visible light image is not properly detected, a background image from the detected face area of the infrared image, estimate a face area of the visible light image corresponding to the face area of the infrared image in the visible light image, and remove a background image from the estimated face area of the visible light image; and
    a verifier configured to verify brightness of the face area of the visible light image.

5. The apparatus of claim 4, wherein the controller increases, when the brightness of the face area of the visible light image is smaller than or equal to a preset threshold, brightness of illumination so that the first acquirer re-acquires a visible light image from which a face is recognizable under the controlled brightness of illumination.

6. The apparatus claim 1, further comprising:
    an outputter configured to output at least one of the visible light image acquired by the first acquirer and the infrared image acquired by the second acquirer, wherein said visible light image includes the visible light image re-acquired by the first acquirer under the increased brightness of the face area by the controller.

7. An apparatus for recognizing a face of a person, comprising:
    a first acquirer configured to acquire a visible light image of the person;
    second acquirer configured to acquire an infrared image of the person;
    an analyzer configured to detect respective face areas of the visible light image and the infrared image, estimate a face area of the visible light image using the infrared image in the case of not detecting the face area of the visible light image, and analyze facial features in the detected or the estimated face area of the visible light image to determine whether or not the detected or the estimated face area of the visible light image has suitability for face recognition; and
    a display configured to selectively display one of the visible light image and the infrared image based on the determination result of the analyzer.

8. The apparatus of claim 7, wherein the analyzer includes:
    a detector configured to detect the respective face areas from the visible light image and the infrared image;
    a extractor configured to remove, when the face area of the visible light image is detected, a background image from the detected face area of the visible light image and extract the facial features from the face area of the visible light image; and
    a verifier configured to verify whether or not the facial features are exactly extracted for face recognition.

9. The apparatus of claim 8, wherein the display displays the infrared image when the facial features are not exactly extracted and displays the visible light image when the facial features are exactly extracted.

10. The apparatus of claim 7, wherein the analyzer includes:
    a detector configured to detect the respective face areas of the visible light image and the infrared image;
    an estimator configured to remove, when the face area of the visible light image is not properly detected, and a background image from the detected face area of the infrared image, estimate a face area of the visible light image corresponding to the face area of the infrared image in the visible light image, and remove a background image from the estimated face area of the visible light image; and
    a verifier configured to verify brightness of the face area of the visible light image.

11. The apparatus of claim 10, wherein the display displays the infrared image when the brightness of the face area of the visible light image is smaller than or equal to a preset threshold.

* * * * *